United States Patent [19]

Stroud et al.

[11] 3,770,976
[45] Nov. 6, 1973

[54] SYSTEM FOR INCREASING THE OUTPUT OF A MULTI-PHASE RECTIFIED ROTARY FIELD SYSTEM

[75] Inventors: Lebern W. Stroud; Jack E. Everett, both of Fort Worth, Tex.

[73] Assignee: R. G. Ralls, Saginaw, Tex. ; a part interest

[22] Filed: Aug. 24, 1972

[21] Appl. No.: 283,496

[52] U.S. Cl. ............................... 307/10R, 219/133
[51] Int. Cl. ............................................. H02p 11/00
[58] Field of Search ......................... 307/10 R, 38; 219/133

[56] References Cited
UNITED STATES PATENTS

| | | | |
|---|---|---|---|
| 3,471,706 | 10/1969 | Schneider | 307/10 R |
| 3,497,709 | 2/1970 | Chilton et al. | 307/10 R |
| 3,586,868 | 6/1971 | Martens et al. | 307/10 R |
| 3,668,514 | 6/1972 | Peck | 307/10 R X |
| 3,676,694 | 7/1972 | Schneider | 307/10 R |

Primary Examiner—William M. Shoop, Jr.
Attorney—Wm. T. Wofford et al.

[57] ABSTRACT

The specification discloses a system adapted to be coupled to the alternator-rectifier system of a motor vehicle and including feedback means for employing the output of the alternator-rectifier system for self-exciting the rotary field thereof when current is drawn from the output by a welding unit or other type of load. A DC power supply is employed normally to excite the rotary field during no-load conditions. The output of the DC power supply to the rotary field is terminated when the load draws current from the output of the alternator-rectifier system.

9 Claims, 4 Drawing Figures

PATENTED NOV 6 1973 3,770,976
SHEET 1 OF 2

SYSTEM FOR INCREASING THE OUTPUT OF A MULTI-PHASE RECTIFIED ROTARY FIELD SYSTEM

BACKGROUND OF THE INVENTION

This invention relates to a system for increasing the power and current from the electrical system of a motor vehicle for operating a load such as a welding system.

Heretofore, a need has existed for a portable welding system which may be operated off of the electrical system of a conventional motor vehicle and which is capable of producing a large power output sufficient for carrying out heavy welding operations. Welding systems have been built or proposed to operate off of the alternator output of a motor vehicle however the output has been limited by the battery which is tied to the alternator in such systems previously built or proposed.

SUMMARY OF THE INVENTION

It is the object of the present invention to provide a system adapted to be coupled to a multi-phase rectified rotary field system to increase the power and current for a work load, through regenerative feedback. The system comprises a DC power supply for normally exciting the rotary field of the multi-phase system and output means coupled to the output of the multi-phase system for applying power to a work load upon demand. Means is provided which is responsive to current flow from the output of the multi-phase system to the load for coupling the output of the multi-phase system back to its rotary field input to self-excite the multi-phase system. In addition means is provided for blocking or terminating the output of the DC power supply to the rotary field when the output of the multi-phase system is applied to the rotary field.

In a further aspect, the system includes feedback circuitry including normally opened control switch means coupled from the output of the multi-phase system to the input of the rotary field. Control means responsive to current flow from the output of the multi-phase system to the load is provided for closing the control switch means for applying the output of the multi-phase system back to its rotary field. DC power supply circuitry also is coupled from the DC power supply to the feedback circuitry by way of a diode which becomes reversed biased when the output of the multi-phase system is applied to the rotary field to block the output of the DC power supply to the rotary field.

In a further aspect, a blocking diode is coupled in the feedback circuitry for blocking current flow from the output of the DC power supply to the output of the multi-phase system.

The above system is particularly adapted to be coupled to the electrical circuitry of a conventional motor vehicle by providing a switching system for; disconnecting the regulator from the alternator-rectifier system and connecting the feedback circuitry to the rotary field; disconnecting the motor vehicle power supply from the output of the alternator-rectifier system and connecting the DC power supply to the rotary field and to a relay coil for controlling the control switch means in the feedback circuitry.

In a further aspect, ther is provided a capacitor coupled to the alternator-rectifier system and adapted to be grounded for further increasing the voltage output for use in welding thin gauge material or for operation of small power tools.

DETAILED DESCRIPTION OF THE INVENTION

Figure 2:
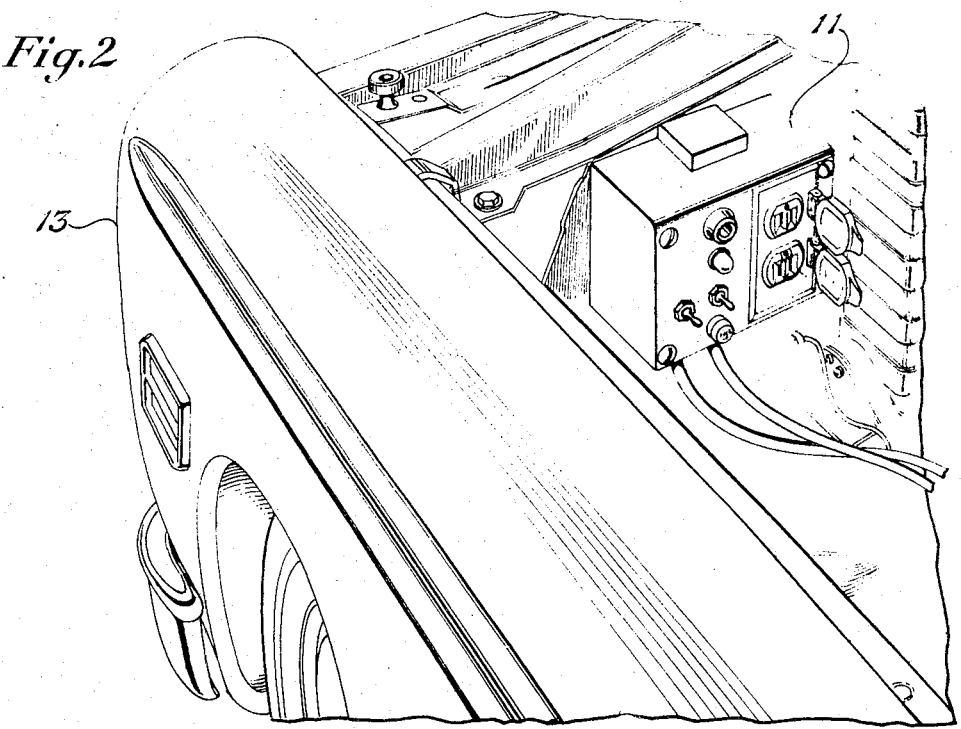
FIG. 2 illustrates the present system attached to a motor vehicle under the hood and adapted to be connected to the electrical system of the motor vehicle.
Figure 3:
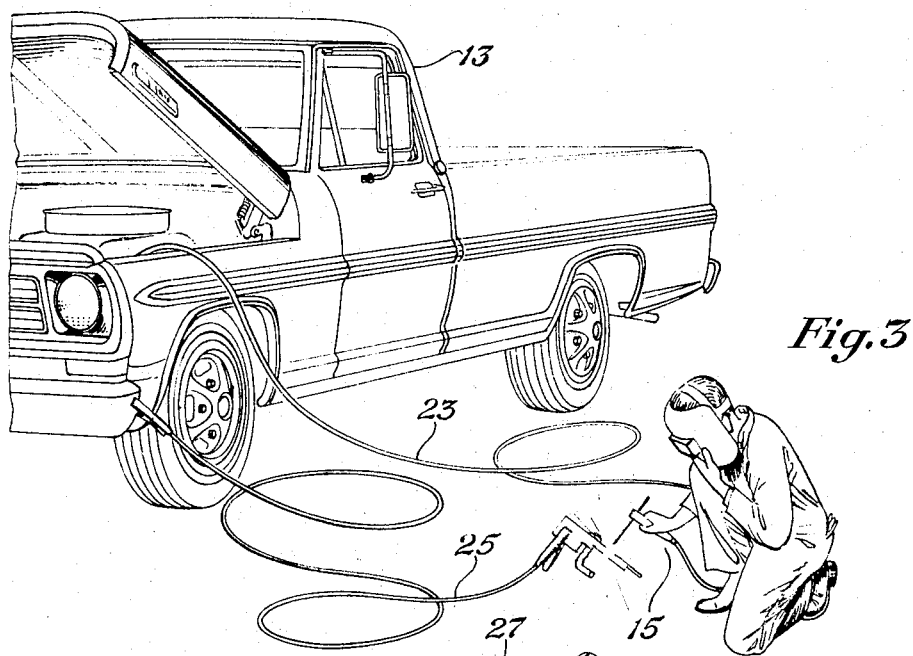
FIG. 3 illustrates a welding electrode extending from the present system when coupled to the electrical system of a motor vehicle.
Figure 1:
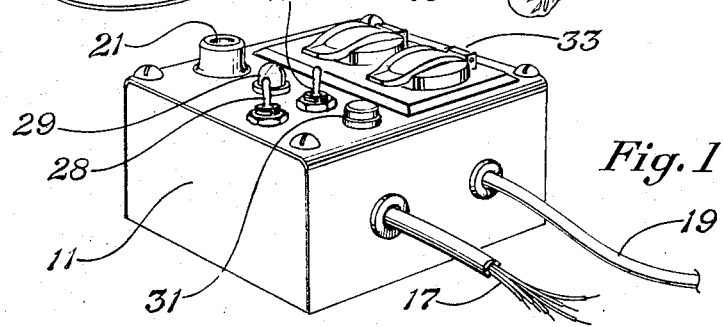
FIG. 1 illustrates the present system encased in a container to be attached to a motor vehicle.

Referring now to FIGS. 1–3, the present system is identified at 11 and is shown coupled to a truck 13 for increasing the power and current output of its alternator-rectifier system for operating a work load such as a welding unit illustrated at 15. The system 11 is enclosed in a box which may be permanently secured to the truck 13 under its hood. Although the system 11 is shown in combination with a truck it is to be understood that it can be employed with other types of motor vehicles.

The system 11 has a plurality of leads 17 adapted to be coupled to th electrical system of the motor vehicle as well as a lead 19 also to be coupled to the electrical system. An anode plug 21 is provided for connection with a cable 23 which is shown coupled to the electrode holder of the welding unit 15. A ground cable 25 is attached by way of clamps to the frame of the vehicle and to the metal to be welded. Also located on the exterior of the box 11 is a master switch 27, a second switch 28, a pilot light 29, and a fuse 31. Outlets 33 are provided for operating small power tools off of the system 11.

Figure 4:
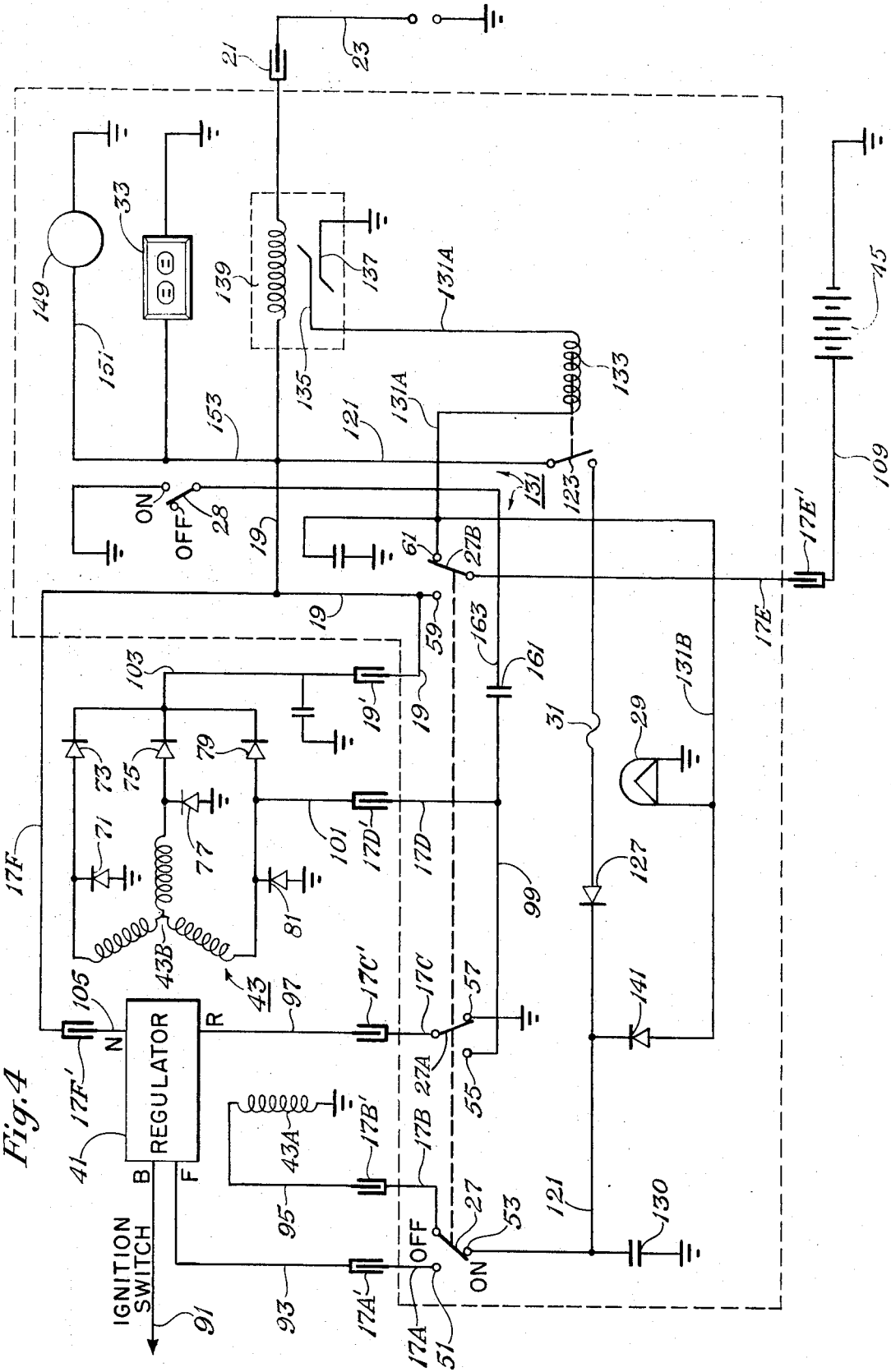
FIG. 4 illustrates the electrical circuitry of the present system.

Referring to FIG. 4, the system 11 is illustrated in the dotted line. The electrical leads 17 comprise leads 17A–17F and are employed for connecting system 11 to the vehicle regulator 41, alternator-rectifier system 43, and battery 45. Lead 19 connects the output of the alternator-rectifier system 43 with the system 11 and to the anode plug 21. Each of the leads 17A–17F and lead 19 have connectors 17A'–17F' and connector 19' respectively for allowing the leads to be connected to the regulator 41, the alternator-rectifier system 43, and the battery 45 after the system 11 has been installed.

The master switch is illustrated at 27 and controls ganged switches 27A and 27B when moved to its ON or OFF positions for switching the system 11 into or out of the electrical system of the motor vehicle. Switch 27 is adapted to contact either terminal 51 or 53, switch 27A contacts either terminal 55 or 57, while switch 27B contacts either terminal 59 or 61. In the ON position of the switch 27 the switches 27, 27A and 27B will be in the positions shown (in contact with terminals 53, 57, and 61 respectively) to switch the power system 11 in for work load operations. In the OFF position of the switch 27, the switches 27, 27A, and 27B will be switched to opposite positions (in contact with terminals 51, 55, and 59 respectively) to switch the system 11 out and to allow the motor vehicle to be operated under normal driving conditions.

For normal driving operations switch 28 will be moved to the OFF position. It will be switched to the ON positions when welding thin gauge metals or for power tool operations as will be described subsequently.

The alternator-rectifier system 43 and regulator 41 illustrated are of the type produced by Delco-Remy as disclosed on pages 1-62 – 1-67 of "Motors Auto Repair Manual, 34th Edition," published by Motor, 250 West 55th Street, New York, 1971. In this respect, the alternator-rectifier system 43 includes a rotor field coil 43A which is rotated inside a stationary stator by the vehicle engine. The stator comprises a three-phase stator winding 43B in which the phase windings are electrically 120° apart. Coupled to the stator windings are diode rectifiers 71, 73, 75, 77, 79, and 81. Each pair of diodes connected to a stator winding acts as a voltage doubler. When the field coil 43A is excited electrically and rotated within the stator, alternating current will be induced in the three-phase stator windings which will be rectified by the silicon diodes whereby the output of the three-phase rectified system will be a pulsating voltage having a DC component. The frequency of the pulsating voltage will be dependent upon the rpm of the engine while the magnitude of the DC component will be dependent upon the engine rpm as well as the electrical input to the rotary field.

When the switch 27 is moved to the OFF position to switch the system 11 out of the electrical system of the vehicle to allow the vehicle to operate under normal driving conditions, the battery and alternator-rectifier system output will be connected together and to the regulator which will be connected to the field coil 43A of the alternator-rectifier system. Thus the output of the alternator-rectifier system will be applied to maintain a charge on the battery and the field coil 43A of the alternator-rectifier system will be excited by the battery by way of the regulator.

As illustrated, the regulator 41 has a B terminal to be connected to the ignition switch of the motor vehicle by way of conductor 91. In addition F, R, and N terminals are also provided. In the OFF position of the switch 27 the F terminal of the regulator will be connected to the field coil 43A by way of conductor 93, conductor 17A, switch 27, conductor 17B, and conductor 95. Slip rings (not shown) are provided to allow the rotatable field coil 43A to be connected electrically to conductor 95 and to ground. The R terminal of the regulator will be connected to the stator winding 43 by way of conductor 97, conductor 17C, switch 27A, conductor 99, conductor 17D, and conductor 101. The N terminal of the regulator will be connected to the output 103 of the alternator-rectifier system and to battery 45. Connection to output 103 will be by way of conductor 105, conductor 17F, and conductor 19 while connection to battery 45 also will be by way of switch 27B, conductor 17E and conductor 109.

In the normal operations of the alternator-rectifier system and regulator, the regulator senses the voltage at the stator by way of terminal R and if it increases beyond a certain level then the regulator reduces the input applied to the rotary field by way of terminal F thereby reducing the output of the alternator-rectifier system. In the conventional motor vehicle employing a 12 volt battery, the regulator limits the output of the three-phase rectifier system to not greater than 15.5 volts DC to prevent overcharging of the battery.

When the master switch 27 is moved to the ON position shown in FIG. 4, the regulator 41 will be disconnected from the alternator-rectifier system 43 and the battery 45 will be disconnected from the regulator 41 and from the output of the alternator-rectifier system. In addition, a feedback circuitry will be connected from the output of the alternator-rectifier system to the field coil 43A and which will allow the alternator-rectifier system to be self-excited when the work load, coupled to the output of the alternator-rectifier system, draws current. Self-excitation of the alternator-rectifier system will provide increased power and current for the load upon demand. The output will be a pulsating output having a DC component.

The feedback circuitry comprises conductor 121 coupled to conductor 19 and to terminal 53. Coupled in the feedback circuitry 121 is a normally open switch 123, the fuse 31, a diode 127, and a capacitor 130 coupled to ground. Also provided is a circuitry 131 coupled to terminal 61 and including conductor 131A having a solenoid coil 133 coupled to a contact 135 which along with contact 137 form a normally open magnetic reed type switch which is controlled by a solenoid coil 139 coupled in the output 19. The circuitry 131 also includes conductor 131B which is connected to the feedback circuitry by way of diode 141. Conductor 131B additionally includes the pilot light 29.

For heavy welding operations, the vehicle's engine will be started and master switch 27 then will be switched to the ON position to switch the system 11 into the motor vehicle electrical system. Switch 28 will remain in the OFF position. A manual throttle control (not shown) will be adjusted to obtain the desired rpm of the engine and hence the desired output voltage from the three-phase rectified system depending upon the thickness of the material desired to be welded. A volt meter 149 coupled to the output 19 by way of conductor 151 and conductor 153 is provided to allow the operator to monitor the output to obtain the desired voltage output under no-load conditions.

When the master switch 27 is moved to the ON position to switch in the system 11, switch 27 will disconnect the F terminal of the regulator 41 from the rotary field and connect the feedback circuitry 121 to the rotary field instead. Switch 27B will disconnect the battery 45 from output 19 and connect the battery to circuitry 131. In addition, switch 27A will disconnect the R terminal of the regulator from the stator winding.

Under no-load conditions, contacts 135 and 137 will be open. In addition the feedback circuitry will be opened by normally open switch 123 and the field coil 43A will be excited by the battery 45. The flow path from battery 45 to coil 43A will be by way of conductor 109, conductor 17E, switch 27B, conductor 131B, diode 141, feedback circuitry 121, switch 27, conductor 17B, and conductor 95. Pilot light 29 also will be energized when the rotary field is excited by battery 45. Under no-load conditions when the rotary field is excited by the battery, the voltage at 19 will be a function only of the engine rpm while the current at the output will be zero. The current supplied to the rotary field 43A from battery 45 will be constant and will be about 2 or 3 amps.

When welding operations are begun and an arc is struck, the coil 139 will draw current to close contacts 135 and 137. When this occurs, the output from the battery 45 will be applied to energize relay coil 133 to close switch 123 thereby completing the feedback circuitry from the output of the alternator-rectifier system to the rotary field coil 43A to self-excite the alternator-rectifier system. The output from the three-phase rectified system applied through the feedback circuitry 121 will be at a greater potential than the output of battery 45 whereby diode 141 will be reversed biased and will block and terminate the battery output to the field coil 43A. Thus the alternator-rectifier system will be completely self-excited to produce an increase in output power and current.

In this respect under load conditions the current output of the alternator-rectifier system depends on the magnetic flux density produced by the rotary field 43A and the rpm of the rotary field. The voltage output depends on the rpm and will be limited by the load. If the rpm is fixed as will be the case for a given welding operation, the voltage output will drop from no-load when an arc is struck and will be held at a certain level. The current output, however, will vary dependent upon the rpm and flux density produced by the rotary field, the flux density of which will be a function of the current applied to the rotary field.

In normal welding operations, it has been found that the current differential between a normal arc and a full short is about 5 amps. For example if an electrode is to be operated at 60 amps maximum, 55 amps will be consumed by the load, and 5 amps will be applied back to self-excite the rotary field. This amount of current is nearly double that applied to the rotary field when excited by the battery 45. Thus as soon as the 5 amps of current is applied back to the rotary field the current at output 19 increases for example to about 100 amps. About 95 percent of the amount will be consumed by the load. Hence when the rotary field is self-excited by the output of the three-phase rectified system a large amount of current will be provided to allow heavy welding operations to be carried out.

The protective fuse 31 is provided to protect the rotary field in the event that the feedback current rises above 7½ amps. Although the rotary field can withstand more current, the fuse 31 is rated at 7½ amps.

Due to the frequency of the output, the welding electrode generally will not stick during normal welding operations. If it does stick and the electrode becomes grounded there will be no feedback since all of the current will be flowing to ground. At this point the rotary field will become excited by the battery. After the electrode is broken free and an arc again struck feedback again will be applied to self-excite the rotary field.

The purpose of the diode 127 is to prevent the output from the battery 45 from being applied to the output 19. Capacitor 130 also is employed to obtain a more constant DC level on the rotary field from feedback to protect the points on the contacts of the relay switch 123. It also reduces the inductive reactance of the rotary field 43A.

Provision is also made to increase the voltage output of the three-phase rectifier system to allow small power tools to be operated off of the output as well as to allow welding to be carried out on thin gauge metal which requires a large amount of voltage in order to lengthen the welding arc so that lightweight materials can be welded at low current. In this respect, a capacitor 161 is provided to be electrically coupled between two diodes 79 and 81 of the stator winding and to ground by way of conductor 163 when switch 28 is closed or moved to the ON position. When switch 28 is closed, the capacitor 161 will charge and discharge as the rotary field is cut by each of the stator windings. It has been found that the capacitor 161 when coupled to ground will double the voltage output under no-load conditions. The current output however will not be increased.

In obtaining the desired output at 19 for lightweight welding operations or for power for small power tools by way of outlets 33, master switch 27 will be turned to the ON position and the throttle of the vehicle adjusted until the voltage at the meter 149 reflects about 50 volts. The switch 28 will be turned to the ON position to double this output voltage.

It is to be understood, that the voltage output at 19 can be increased to high levels by racing the engine to higher speeds. By the provision of the capacitor 161 and the switch 28, however, the same high voltage output can be obtained at lower engine speeds which will also maintain the current at a lower value which is desirable when welding thin gauge metals.

In the event that the system is to be used only for operating small power tools, then the feedback circuitry 121, circuitry 131A, circuitry 131B, and relay coil 139 and plug 21 may be eliminated. In addition terminal 61 may be tied directly to terminal 53.

The present system may be used for the following applications:

1. Electrical welding on steel with rod sizes up to ⅛ inches dia.
2. Electrical welding or brazing with rod sizes up to ⅛ inch dia.
3. Cast iron welding.
4. Aluminum welding (with the addition of a heli-arc torch unit using an argon gas shroud)
5. Stainless Steel (with torch accessory)
6. Most types of brazing (with torch accessory)
7. Rapid charging of batteries up to 24 volts.
8. A power source for brush tools, saws, drills, lights, posthole diggers, etc.

In one embodiment the components of the present system have the following specifications:

| | |
|---|---|
| Master Switch 27 | A four pole double throw switch |
| Feed Back Relay Switch 123 and 133 | A 12 volt DC Coil type relay with a double pole single throw normally open switch. |
| Fuse 31 | 6 amp. 3 AG 32 volt feedback fuse & holder |
| Capacitor 130 | 1000 MFD, 50 volt DC Electrolylic capacitor |
| DIODE 127 and 141 | 20 amp. 200 PIV. |
| Meter 149 | 0-150V DC Meter |
| Tool Outlet 33 | 115 volt., 15 amps., Duplex receptacle with weatherproof cover. |
| Reed Switch 135, 137 and relay coil 139 | A magnetic reed switch, inductor actuated and encapsulated for line output insertion (3A holding and 1 amp switching reed) |
| Pilot light 29 | A 12 volt lamp |
| Capacitor 161 | 1000 MFD, 50 volts |

Although the present system is disclosed as being used with a three-phase rectified rotary field system it is to be understood that it can be used with other multi-phase rectified rotary field systems.

We claim:

1. A system adapted to be coupled to a multi-phase rectified rotary field system to increase the power and current through regenerative feedback, comprising:
    a DC power supply for normally exciting the rotary field of said multi-phase system, output means coupled to the output of said multi-phase system for applying power to a load upon demand, means responsive to current flow from the output of said multi-phase system to a load for coupling the output of the multi-phase system to its rotary field to self-excite the multi-phase system, and means for electrically disconnecting the output of said DC power supply from said rotary field when the output of said multi-phase system is applied to said rotary field.

2. A system adapted to be coupled to a multi-phase rectified rotary field system to increase the power an current through regenerative feedback, a DC power supply for normally exciting the rotary field of said multi-phase system, output means coupled to the output of said multi-phase system for applying power to a load upon demand, feedback circuitry including normally open switch means, coupled from the output of said multi-phase system to the input of said rotary field, control means responsive to current flow from the output of said multi-phase system to a load for closing said switch means for applying the output of said multi-phase system to its rotary field to self-excite the multi-phase system, and means for blocking the output of said DC power supply to said rotary field when the output of said multi-phase system is applied to said rotary field.

3. The system of claim 2 comprising:

DC power supply circuitry coupled from said DC power supply to said feedback circuitry for normally applying the output of said DC power supply to said rotary field, said DC power supply circuitry includes said means for blocking the output of said DC power supply when the output of said multi-phase system is applied to the input of said rotary field.

4. The system of claim 3 comprising means coupled in said feedback circuitry for blocking current flow from the output of said DC power supply to the output of the multi-phase system.

5. The system of claim 4 comprising filter means for filtering the output of the multi-phase system applied to the input of said rotary field and for lowering inductive reactance of the rotary field.

6. The system of claim 3 wherein said control means comprises:

a first relay coil coupled to the output of said multi-phase system for closing normally open contact means when power is applied to the load, circuitry coupled from the output of said DC power supply to one of said normally open contact means by way of a second relay coil for closing said switch means in said feedback circuitry when said normally open contact means of said control means are closed by said first relay coil.

7. A system to be coupled to the electrical system of a motor vehicle having a DC power supply, a regulator, and an alternator-rectifier system employed normally to charge the DC power supply and whose rotary field is driven by the vehicle engine, said regulator being normally connected to the rotary field of said alternator-rectifier system such that the rotary field is normally excited by the DC power supply by way of the regulator, the output of said alternator-rectifier system normally being connected to the input of said regulator and to said DC power supply, said system comprising:

output means to be coupled to the output of the alternator-rectifier system for applying power to a work load upon demand, feedback circuitry including normally open switch means coupled from the output of the alternator-rectifier system and adapted to be coupled to the rotary field, means for disconnecting the regulator from the rotary field of said alternator-rectifier system and for connecting said feedback circuitry to said rotary field, control circuitry to be connected to the output of the DC power supply and to normally open relay contacts by way of a relay coil for controlling said switch means in said feedback circuitry, DC power supply circuitry coupled from said DC power supply to said feedback circuitry, means for disconnecting the DC power supply from the output of said alternator-rectifier system and for connecting the DC power supply to said control circuitry and to said DC power supply circuitry, means coupled to the output of said alternator-rectifier system for closing said relay contacts in response to a load demand for energizing said relay coil in said control circuitry for closing said switch means in said feedback circuitry for completing a circuit from the output of said alternator-rectifier system to said rotary field by way of said feedback circuitry, said DC power supply circuitry including means for blocking the output of said DC power supply to said rotary field when the output of said alternator-rectifier system is applied to said rotary field.

8. The system of claim 2 wherein said multi-phase rectified rotary field system includes a multi-phase stator winding having a plurality of phase windings, a rotary coil to be electrically excited and rotated in the vicinity of said phase windings, and two rectifiers coupled to each of said phase windings, capacitor means coupled to the junction between the two rectifiers of one of said phase windings and adapted to be grounded for increasing the output voltage of said multi-phase rectified rotary field system.

9. A system adapted to be coupled to a multi-phase rectified rotary field system to increase the electrical output voltage thereof, said multi-phase rectified rotary field system includes a multi-phase stator winding having a plurality of phase windings, a rotary coil to be electrically excited and rotated in the vicinity of said phase windings, and two rectifiers coupled to each of said phase windings, said system comprising:

a DC power supply for exciting the rotary field of said multi-phase system, output means coupled to the output of said multi-phase system for applying power to a load, and capacitor means coupled to the junction between the two rectifiers of one of said phase windings and adapted to be grounded for increasing the output voltage of said multi-phase rectified rotary field system.

* * * * *